US008432001B2

(12) United States Patent
Jung et al.

(10) Patent No.: US 8,432,001 B2
(45) Date of Patent: Apr. 30, 2013

(54) ELECTRIC FIELD INFORMATION READING HEAD, ELECTRIC FIELD INFORMATION WRITING/READING HEAD AND FABRICATION METHODS THEREOF AND INFORMATION STORAGE DEVICE USING THE SAME

(75) Inventors: Ju-hwan Jung, Yongin-si (KR); Hyoung-soo Ko, Yongin-si (KR); Hong-sik Park, Yongin-si (KR); Yong-su Kim, Yongin-si (KR); Seung-bum Hong, Yongin-si (KR)

(73) Assignee: Seagate Technology LLC, Cupertino, CA (US)

( * ) Notice: Subject to any disclaimer, the term of this patent is extended or adjusted under 35 U.S.C. 154(b) by 759 days.

(21) Appl. No.: 12/300,177

(22) PCT Filed: May 10, 2007

(86) PCT No.: PCT/KR2007/002310
§ 371 (c)(1),
(2), (4) Date: Feb. 2, 2010

(87) PCT Pub. No.: WO2007/129871
PCT Pub. Date: Nov. 15, 2007

(65) Prior Publication Data
US 2010/0232061 A1    Sep. 16, 2010

(30) Foreign Application Priority Data

May 10, 2006 (KR) .................. 10-2006-0041971
Nov. 1, 2006 (KR) .................. 10-2006-0107484

(51) Int. Cl.
*H01L 29/94* (2006.01)
*H01L 21/00* (2006.01)

(52) U.S. Cl.
USPC ............... 257/379; 257/364; 438/3; 438/210

(58) Field of Classification Search .......... 257/364, 257/379, 380, 421, 424, 425, 427; 438/14, 438/210, 48, 57, 3
See application file for complete search history.

(56) References Cited

U.S. PATENT DOCUMENTS

| 4,520,413 A | 5/1985 | Piotrowski et al. |
| 6,515,957 B1 | 2/2003 | Newns et al. |

(Continued)

FOREIGN PATENT DOCUMENTS

| CN | 1308327 A | 8/2001 |
| EP | 1091355 A | 4/2001 |

(Continued)

OTHER PUBLICATIONS

Communication issued Apr. 13, 2010 by State Intellectual Property Office of P.R. China in counterpart Chinese Application No. 200780026478.

(Continued)

*Primary Examiner* — Kevin M Picardat
(74) *Attorney, Agent, or Firm* — Hollingsworth Davis, LLC

(57) ABSTRACT

Provided is an electric field information reading head for reading information from a surface electric charge of an information storage medium, the electric field information reading head comprising a semiconductor substrate having a resistance region formed in a central part at one end of a surface facing a recording medium, the resistance region being lightly doped with impurities, and source and drain regions formed on both sides of the resistance region, the source region and the drain region being more highly doped with impurities than the resistance region. The source region and the drain region extend along the surface of the semiconductor substrate facing the recording medium, and electrodes are connected electrically with the source region and the drain region respectively. In addition, provided is a method of fabricating the electric field information reading head and a method of mass-producing the electric field information reading head on a wafer.

22 Claims, 8 Drawing Sheets

U.S. PATENT DOCUMENTS 6,850,480 B1 2/2005 Naito et al.
7,141,999 B2 * 11/2006 Park et al. ................ 324/755.07

FOREIGN PATENT DOCUMENTS

| EP | 1632954 A | 3/2006 |
| EP | 1653473 A | 5/2006 |
| JP | 2005-012068 A | 1/2005 |
| KR | 10-2003-0087372 A | 11/2003 |
| WO | 2004/021441 A1 | 3/2004 |

OTHER PUBLICATIONS

Park Hongsik et al. "Scanning Resistive Probe Microscopy: Imaging Ferroelectric Domains", Applied Physics Letters, American Institute of Physics, Mar. 8, 2004, vol. 84, No. 10, pp. 1734-1736.

* cited by examiner

ELECTRIC FIELD INFORMATION READING HEAD, ELECTRIC FIELD INFORMATION WRITING/READING HEAD AND FABRICATION METHODS THEREOF AND INFORMATION STORAGE DEVICE USING THE SAME

CROSS-REFERENCE TO RELATED PATENT APPLICATION

This application is a National Stage of International Application No. PCT/KR2007/00002310 filed May 10, 2007. This application claims priority from Korean Patent Application No. 10-2006-0041971 filed on May 10, 2006 and Korean Patent Application No. 10-2006-0107484 filed on Nov. 1, 2006, the disclosures of which are incorporated herein in their entirety by reference.

BACKGROUND OF THE INVENTION

1. Field of the Invention

The present invention relates to an information reading head reading information from a surface electric charge, an electric field information writing/reading head and an information storage device including the same, and more particularly, to an electric field information reading head including a semiconductor substrate having a resistance region, source region and drain to form a surface facing a recording medium, an electric field information writing/reading head, methods of fabricating the information reading head and the electric field information writing/reading head, and an information storage device using the same.

2. Description of the Related Art

Scanning probes having a field effect transistor channel structure, scanning probes having a resistance tip, Electrostatic Force Microscopy (EFM) probes, etc., are commonly used as heads for detecting a polarization of a surface electric charge in a ferroelectric medium in order to read information written in the medium. Such electric field detecting reading/writing devices can be used for recording data with a recording density of 1 Tb/in<2>. On the other hand, in order to store large-scale information in a small area using the probes as described above, thousands of probe arrays should be provided. Thus, the information should be written or read in accordance with the linear motion of a medium or probe arrays. Accordingly, an additional servomechanism should be developed.

In a conventional hard disk drive (HDD), a head moving above a rotating medium reads magnetic recording information from the medium. Thus, an additional servomechanism for recording/reading data is not necessary. However, the maximum recording density that can be obtained in this case is 500 Gb/in even when Perpendicular Magnetic Recording (PMR), i.e., a second-generation recording technology, is used.

Accordingly, an electric field reading/writing head structure which can be used for increasing the data recording density limit of a conventional HDD and a method of fabricating the head structure have been required.

SUMMARY OF THE INVENTION

The present invention provides an electric field information reading head including a semiconductor substrate having a resistance region, source region and drain region, to form a surface facing a recording medium, an electric field information writing/reading head, methods of fabricating the electric field information reading head and the electric field information writing/reading head, and an information storage device including the same.

According to an aspect of the present invention, there is provided an electric field information reading head for reading information from a surface electric charge of a recording medium, the electric field information reading head comprising a semiconductor substrate comprising: a resistance region formed in a central part at one end of surface of the electric field information reading head which faces the recording medium, the resistance region being lightly doped with impurities; and source and drain regions formed on both sides of the resistance region, the source and the drain regions being more highly doped with impurities than the resistance region.

The source and the drain regions respectively may extend along a side adjacent to the surface facing a recording medium of the semiconductor substrate, and electrodes are connected electrically with the source region and the drain region, respectively.

According to another aspect of the present invention, there is provided an electric field information writing/reading head including the electric field information reading head having the above structure: an insulating layer formed on the resistance region; and a writing head formed on the insulating layer.

According to another aspect of the present invention, there is provided an information storage device including: the electric field information reading head having the above structure; and an information storage medium including a ferroelectric recording layer formed of ferroelectrics, wherein the surface facing a recording medium of the electric field information reading head floats to a surface of the recording layer with a predetermined interval to read information written in the information storage medium.

According to another aspect of the present invention, there is provided an information storage device including: the electric field information writing/reading head having the above structure; and an information storage medium comprising a ferroelectric recording layer, wherein the surface facing a recording medium of the electric field information reading head floats to a surface of the recording layer with a predetermined interval to write information on the information storage medium or read information written in the information storage medium.

According to another aspect of the present invention, there is provided a method of fabricating an electric field information reading head, the method including: preparing a semiconductor substrate; forming a mask layer on the semiconductor substrate and patterning the mask layer in order to expose areas for forming source and drain regions; forming the source and drain regions by doped with impurities having a different polarity from that of the semiconductor substrate on a surface, which faces a recording medium; removing some part of the mask layer in order to expose an area for forming a resistance region on the semiconductor substrate; and forming the resistance region by doped with impurities having different polarity from that of the semiconductor substrate on the surface.

The method may further include forming electrodes on a surface of the semiconductor substrate.

The method may include: forming at least one unit constituting rows of the at least one electric field information reading head on a wafer; cutting per the unit on the wafer; forming an ABS pattern each corresponding to the electric field information reading head on a cutting surface of the unit; and separating each of the electric field information reading head from the unit on which the ABS pattern is formed.

According to another aspect of the present invention, there is provided a method of fabricating an electric field information writing/reading head, the method comprising: forming at least one unit constituting rows of the at least one electric field information writing/reading head on a wafer; cutting per the unit on the wafer; forming an ABS pattern each corresponding to the electric field information reading head on a cutting surface of the unit; and separating each of the electric field information reading head from the unit on which the ABS pattern is formed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF EXEMPLARY EMBODIMENTS

Figure 1:
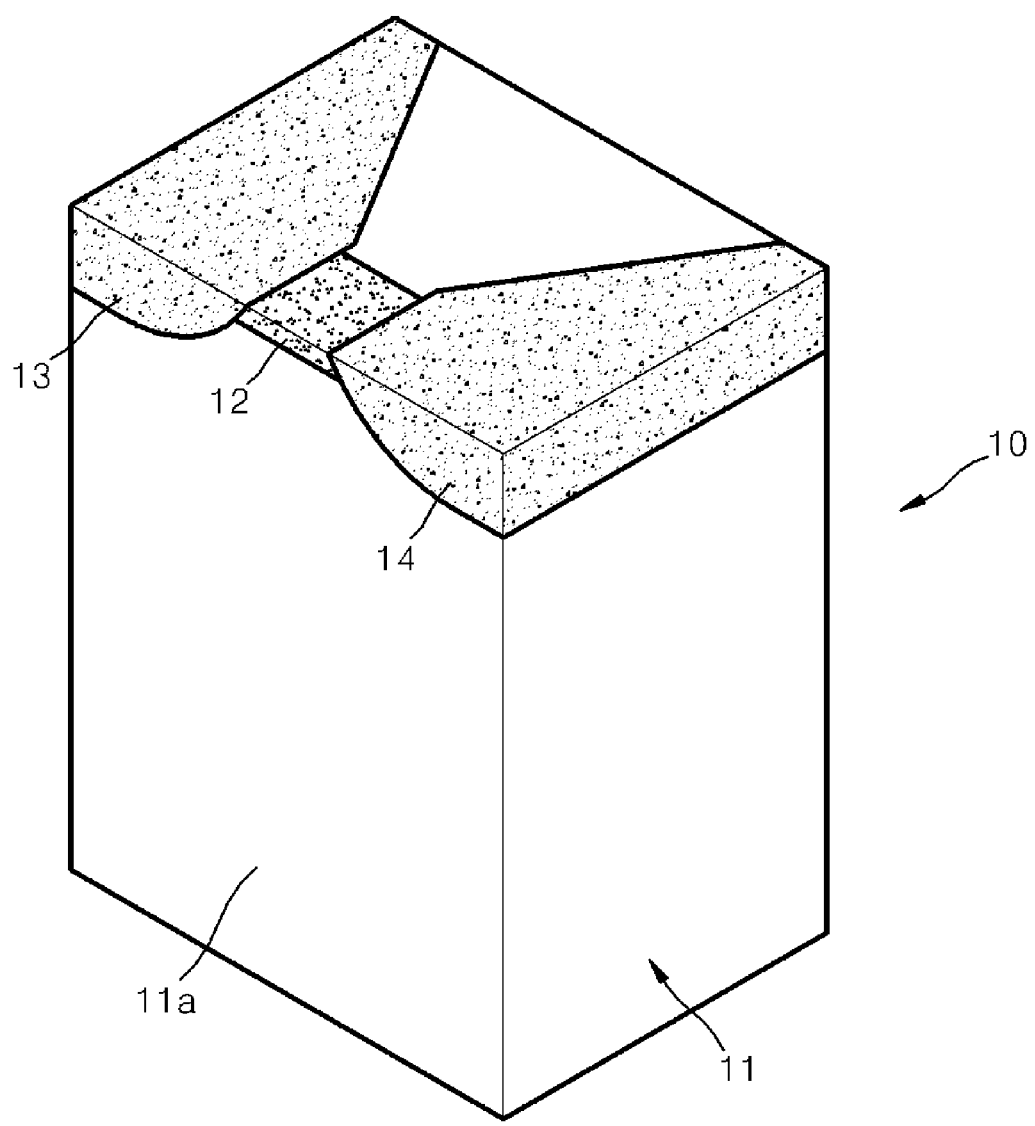
FIG. 1 is a perspective view illustrating an electric field information reading head according to an embodiment of the present invention.

The present invention will now be described more fully with reference to the accompanying drawings, in which exemplary embodiments of the invention are shown. Like reference numerals in the drawings denote like elements.

Figure 2:
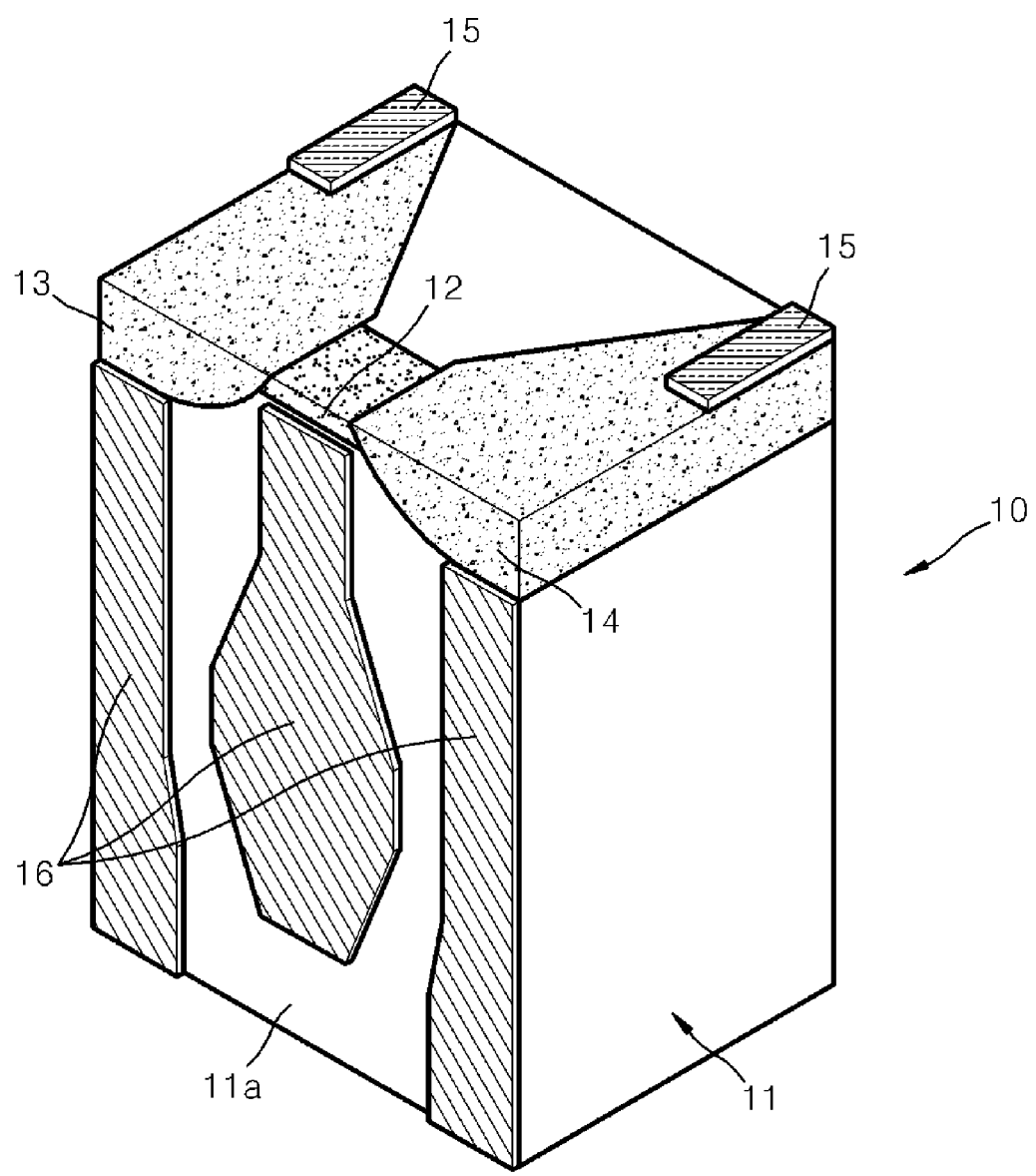
FIG. 2 is a perspective view illustrating an electric field information reading head according to another embodiment of the present invention.
Figure 3:
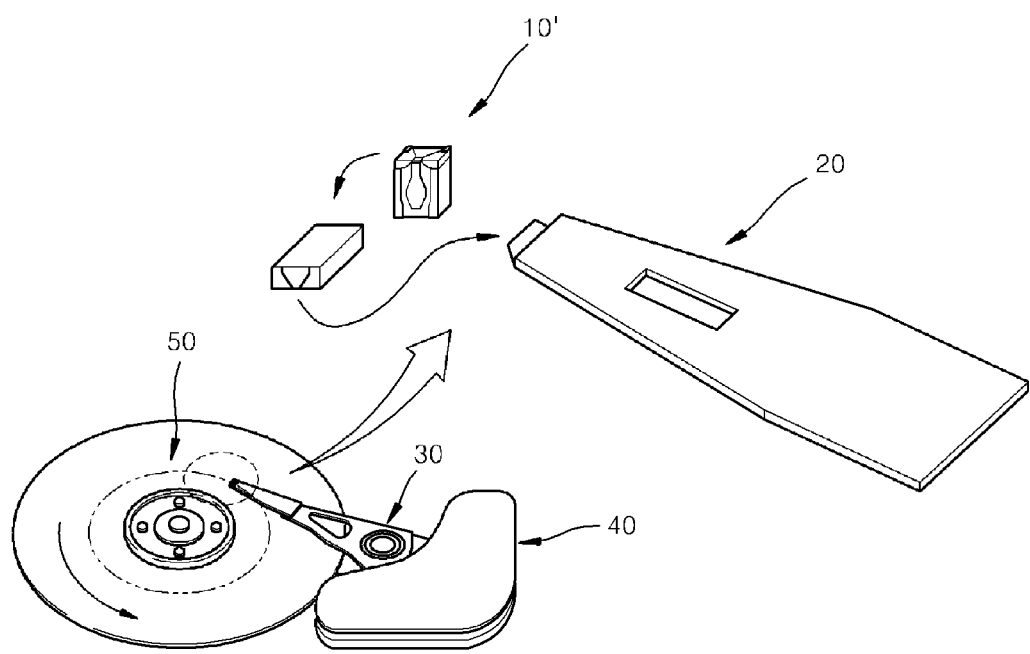
FIG. 3 illustrates schematically a hard disk drive (HDD) mechanism having the electric field information reading head, according to an embodiment of the present invention.

FIGS. 1 and 2 are perspective views illustrating electric field information reading heads 10 according to embodiments of the present invention. FIG. 3 illustrates schematically a hard disk drive (HDD) mechanism using the electric field information reading head 10 of HG 2.

Referring to FIG. 1, the electric field information reading head 10 includes a semiconductor substrate 11 doped with first impurities and having a surface 11a, which faces a recording medium (not shown) and constitutes an Air Bearing Surface (ABS), a resistance region 12 formed on a central part of one end of the semiconductor substrate 11 and doped with second impurities having a low concentration, and source and drain regions 13 and 14 formed on both sides of the resistance region 12 and doped with second impurities having a high concentration. Here, when the first impurities are p-type impurities, the second impurities are n-type impurities, or vice versa.

The electric field information reading head 10 may further include an ABS pattern 16 formed on the surface 11a as shown in FIG. 2.

In the electric field information reading head 10, a difference between resistance values of the resistance regions 12 is caused by a difference between electric fields generated by a difference between surface electric charges in a ferroelectric recording medium. A polarity and value of a surface electric charge can be respectively detected by the difference between the resistance values of the resistance region 12.

Referring to FIGS. 1 and 3, a method of detecting a polarization of a surface electric charge in a recording medium 50 to read information therefrom is as follows. Referring to FIG. 1, when the resistance region 12 is lightly doped with p-type impurities and the source and the drain regions 13 and 14 are highly doped with p-type impurities and the recording medium 50 has a positive (+) surface electric charge in a region corresponding to the resistance region 12, then, a density of a holes as a majority carrier in the resistance region 12 is decreased by an electric field generated from an electric charge, and thus a resistance value of the resistance region 12 is increased. Thereby, the electric field information reading head 10 can detect the positive (+) surface electric charge by a change of the resistance value of the resistance region 12. When the recording medium 50 has a negative (−) surface electric charge in a region corresponding to the resistance region 12, the density of the holes as the majority carrier in the resistance region 12 is increased, and thus the resistance value of the resistance region 12 is decreased. Thereby, the electric field information reading head 10 detects the electric charge on the surface of the recording medium 50.

On the other hand, when the source and the drain regions 13 and 14 are highly doped with n-type impurities, the resistance region 12 is lightly doped with n-type impurities, and the recording medium 50 has a negative (−) surface electric charge in a region corresponding to the resistance region 12, the frequency of an electron as a majority carrier in the resistance region 12 is decreased, and thereby a resistance value of the resistance region 12 is increased. On the other hand, when the recording medium 50 has a positive (+) surface electric charge in a vicinity of a region corresponding to the resistance region 12, a density of electrons as a majority carrier in the resistance region 12 is increased, and thereby a resistance value of the resistance region 12 is decreased. Accordingly, the electric field information reading head 10 can detect the surface electric charge of the recording medium 50 by a change of the resistance value of the resistance region 12. Here, a current is applied to the source and drain regions 13 and 14 through a metal electrode 15, as illustrated in FIG. 2 to detect the change of the resistance value of the resistance region 12.

Referring to FIGS. 2 and 3, the ABS pattern 16 is formed on the surface 1 of the electric field information reading head 10 so as to floating on the recording medium 50. To read information from the surface electric charge of the recording medium 50 by applying a current to the source and the drain regions 13 and 14, the metal electrodes 15 are formed to be electrically connected to the source and drain regions 13 and the 14 formed not on the surface 11a but on other surface contacting the surface 11a, that is, an upper surface 11b of the semiconductor substrate 11. Since the metal electrodes 15 is formed not on the surface 11a but on the upper surface 11b, the electric field information reading head 10' can be easily applied to a suspension 20 of an HDD mechanism.

Referring to FIG. 3, the recording medium 50 is the ferroelectric medium having at least one ferroelectric recording layer. The electric field information reading head 10 according to the present invention is of a sliding type and is attached to the suspension 20.

A recording density limit in Perpendicular Magnetic Record (PMR), i.e., a second-generation HDD technology, is about 500 Gb/in<2>. On the other hand, when using the electric field read reading/writing device with a ferroelectric recording medium, the ferroelectric recording medium can be recorded a recording density of more than 1 Tb/in. Accordingly, the present invention can be used as an alternative to overcome the recording density limit of the conventional HDD.

FIGS. 4A through 4F are perspective views illustrating operations of fabricating the electric field information reading head 10 according to an embodiment of the present invention.

The method of fabricating the electric field information reading head 10 may include preparing a semiconductor substrate 111, forming a mask layer 150 for forming source and drain regions on the semiconductor substrate 111, forming the source and drain regions on the semiconductor substrate 111, and forming the mask layer 150 for forming a resistance region. In addition, the method may further include forming electrodes.

Figure 4A:
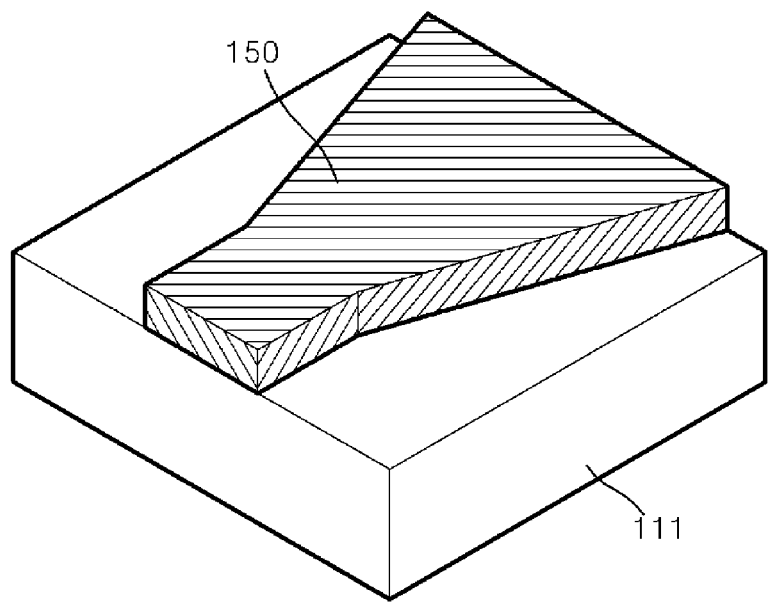
FIGS. 4 A through 4F are perspective views illustrating a method of fabricating the electric field information reading head according to an embodiment of the present invention.

First, referring to FIG. 4A, the mask layer 150 for forming source and drain regions (113 and 114 in FIG. 4B) is formed on an upper surface 111b of the semiconductor substrate 111. The mask layer 150 may be an oxidized mask layer or a photoresist mask layer.

When the mask layer 150 is an oxidized mask layer, a surface layer formed on the upper surface 111b of the semiconductor substrate 111 is thermally oxidized to form the oxidized mask layer. After a photoresist is coated on the oxidized mask layer, the oxidized mask layer is patterned on the upper surface 111b of the semiconductor substrate 111 using a photolithography process in order to expose areas for forming the source and drain regions 113 and 114.

When the mask layer 150 is a photoresist mask layer, after the photoresist mask layer is coated on the upper surface 111b of the semiconductor substrate 111, the photoresist mask layer is patterned using an exposure method in order to expose areas for forming the source and drain regions 113 and 114 on the upper surface 111b of the semiconductor substrate 111.

Figure 4B:
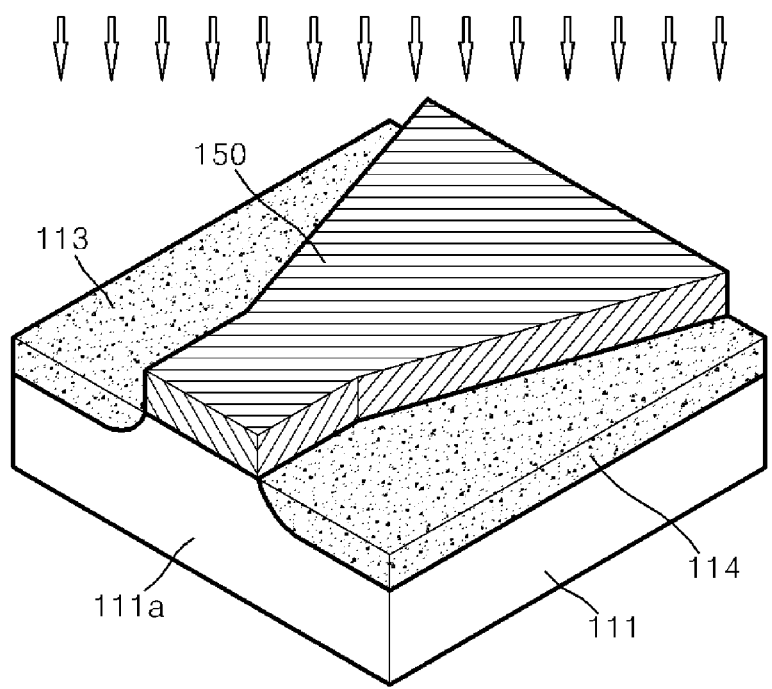
Figure 4C:
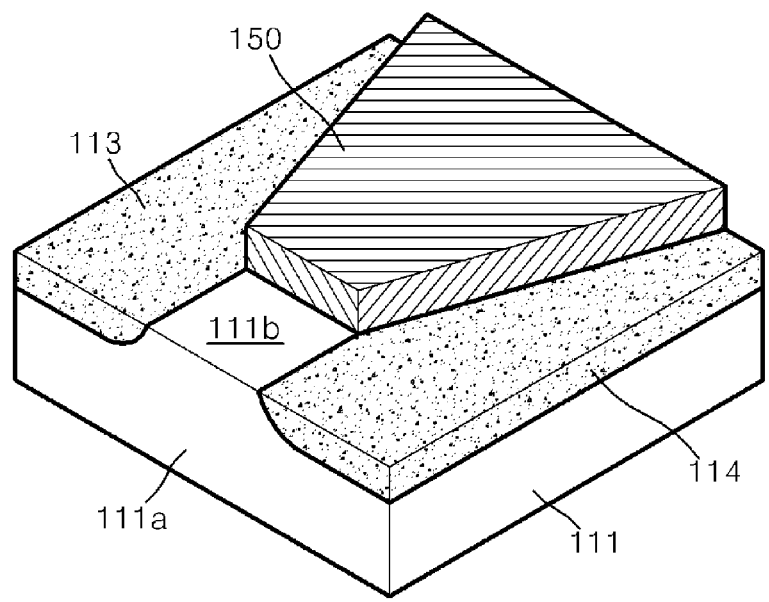

Second, referring to FIG. 4B, the source and drain regions 113 and 114 are formed using an ion implant. In particular, when the mask layer 150 is the oxidized mask layer, the impurities are ion-implanted in the exposed areas of the upper surface 111b of the semiconductor substrate 111 to form the source and drain regions 113 and 114 on the surface 111a of the semiconductor substrate 111. When the mask layer 150 is the photoresist mask layer, the impurities are ion-implanted in the exposed areas of the upper surface 111b of the semiconductor substrate 111 to form the source and drain regions 113 and 114 on the surface 111a.

Thus, the source and drain regions 113 and 114 are evenly formed in areas of the surface 111a. The semiconductor substrate 111 may be a silicon substrate of which crystal direction is (100). When the semiconductor substrate 111 is a p-type semiconductor substrate, the impurities may be n-type impurities. Examples of the n-type impurities may be As, P, etc.

Third, referring to 4C, some part of the mask layer 150 is removed using for example a photolithography process so that a resistance region 112 may be exposed on a central part 111b between the source and drain regions 113 and 114 formed on the semiconductor substrate 111.

When the mask layer 150 is the oxidized mask layer, a photoresist is coated on the mask layer 150 and patterned by a photolithography process in order to expose areas for forming the resistance region 112. The mask layer 150 is etched so that spaces for forming the resistance region 112 and source and drain regions 113 and 114 may be exposed on the upper surface 111b of the semiconductor substrate 111.

When the mask layer 150 is the photoresist mask layer, a metal layer (not shown) is deposited on the photoresist mask layer. The photoresist is coated on the metal layer and patterned by a photolithography process in order to expose areas for forming the resistance region 112. The metal layer is etched so that spaces for forming the resistance region 112 and source and drain regions 113 and 114 may be exposed on the upper surface 111b of the semiconductor substrate 111.

Figure 4D:
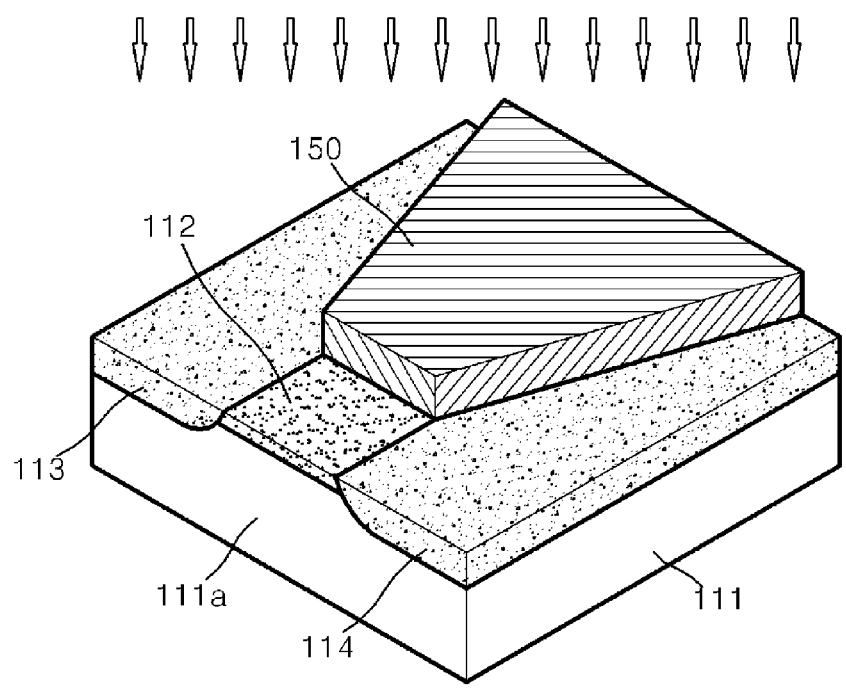

Fourth, referring to FIG. 4D, in order to form the resistance region 112, the newly exposed area of the upper surface 111b of the semiconductor substrate 111 is ion-implanted. In particular, the newly exposed area of the semiconductor substrate 111 is ion-implanted with impurities having lower energy and concentration than the impurities used in forming the source and drain regions 113 and 114. The resistance region 112 is formed so that a concentration difference of the impurities in the resistance region 112 and the impurities in the source and drain regions 113 and 114 is larger. Here, the resistance region 112 is formed evenly in an area of the surface 111a of the semiconductor substrate 111.

Figure 4E:
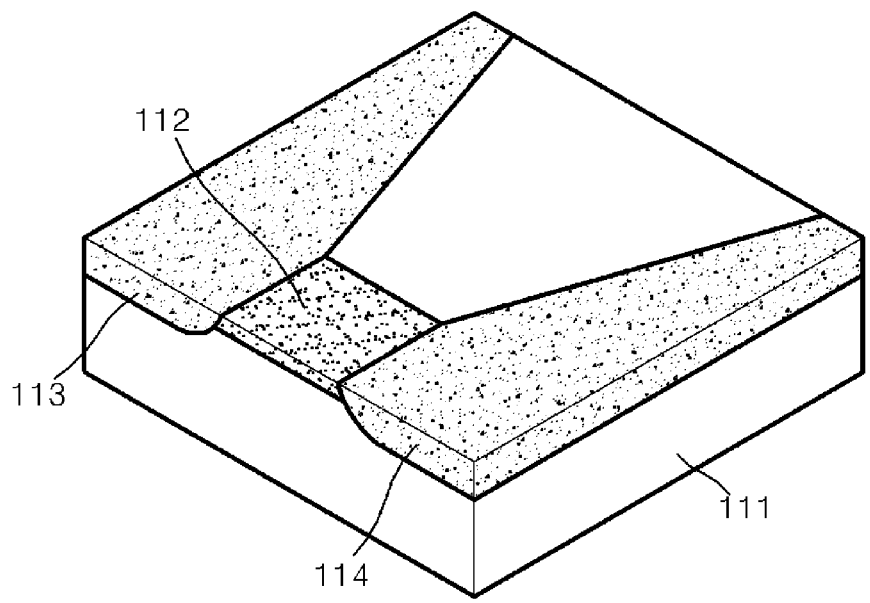

Referring to FIG. 4E, after the resistance region 112 is formed, the mask layer 150 is removed. When the mask layer 150 is the oxidized mask layer, after the resistance region 112 is formed, the oxidized mask layer is removed using a wet etching method, etc. On the other hand, when the mask layer 150 is the photoresist mask layer, the photoresist mask layer and the metal layer are removed simultaneously using an ashing method, etc.

Figure 4F:
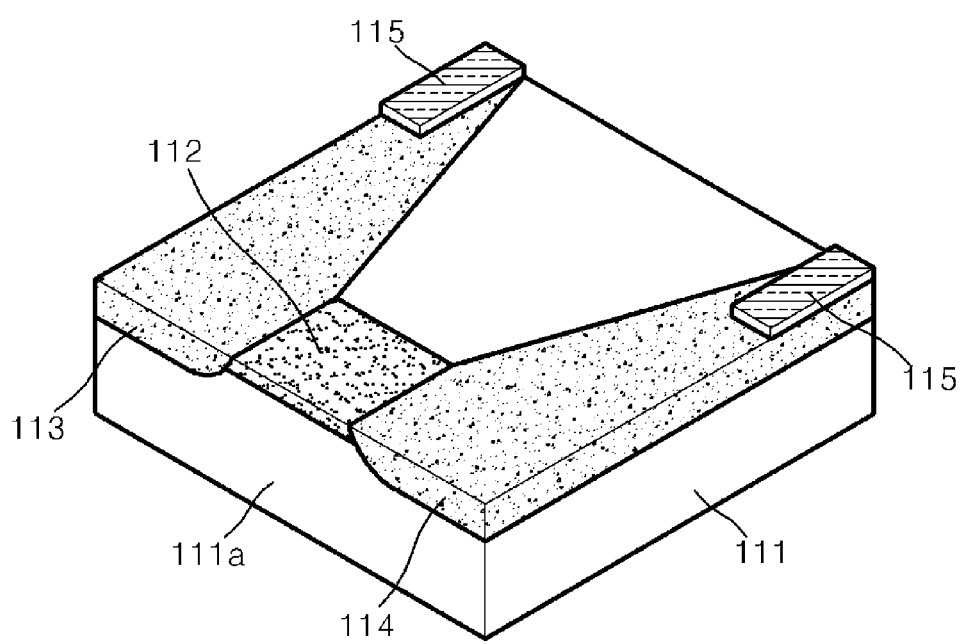

Fifth, referring to FIG. 4F, metal electrodes 115 are formed on parts of the source and drain regions 113 and 114 formed on the upper surface 111b of the semiconductor substrate 111. The source and drain regions 113 and 114 formed on an upper surface of the semiconductor substrate 111 extend from the surface 111a. The metal electrodes 115 may be electrically connected with the source and drain regions 113 and 114, respectively. The metal electrodes 115 may be deposited using various methods. After a metal is deposited on the upper surface 111b of the semiconductor substrate 111, the electrodes 115 having a desired form may be formed using photolithography process. Alternatively, the electrode having a desired form may be formed using a method including: patterning a photoresist into a reverse image on the upper surface 111b of the semiconductor substrate 111; and depositing a metal to form an electrode having a desired form.

Figure 5:
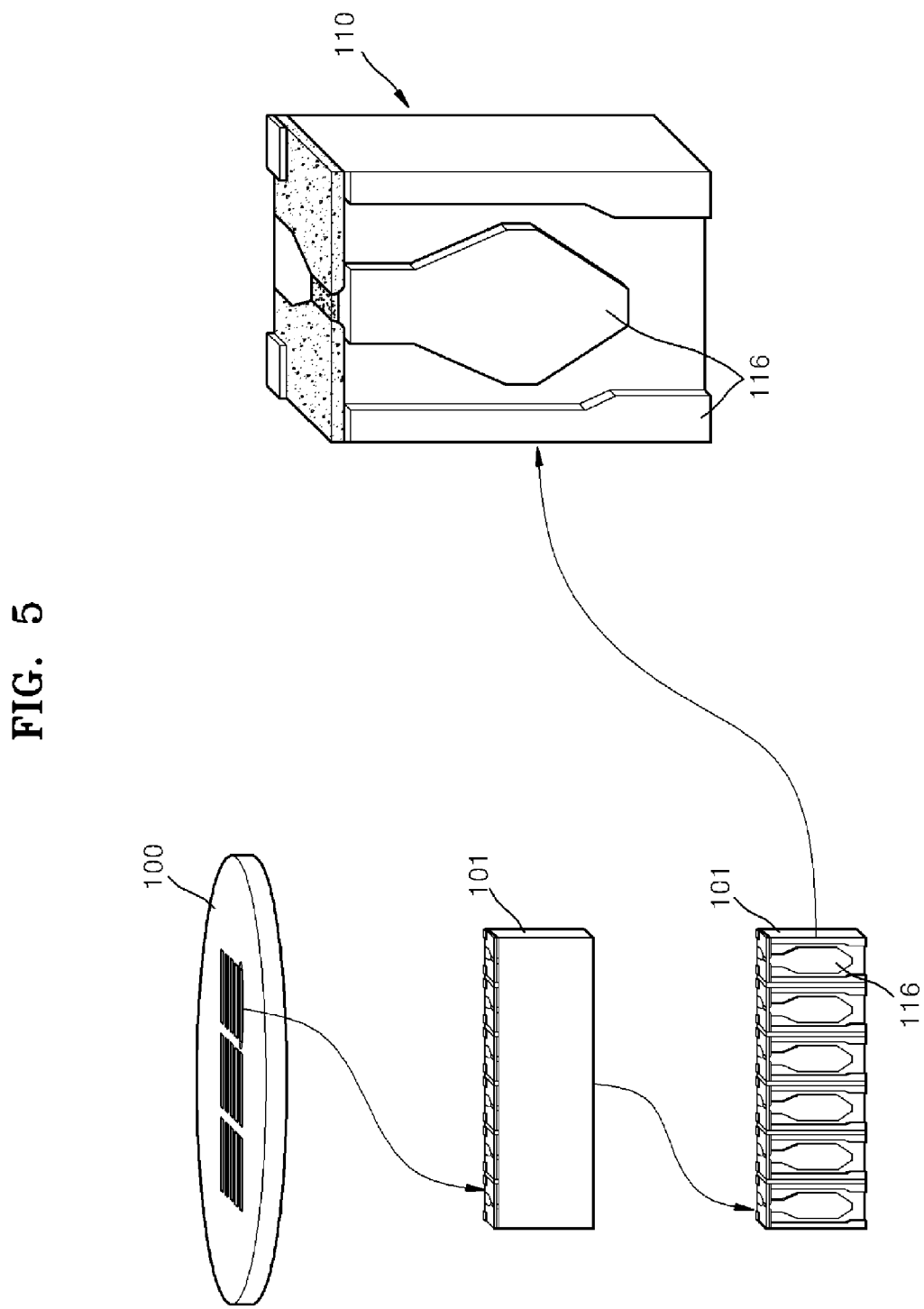
FIG. 5 illustrates a method of fabricating the electric field information reading head of FIG. 2 on a wafer, according to another embodiment of the present invention.

FIG. 5 illustrates a method of fabricating a plurality of electric field information reading heads 110 on a wafer 100, according to an embodiment of the present invention. The method of fabricating a plurality of electric field information reading heads 110 according to a current embodiment of the present invention includes: forming at least an electric field information reading head unit 101 on the wafer 100; separating the electric field information reading head unit 101 from the wafer 100; forming ABS patterns 116 on surfaces of the electric field information reading head unit 101 to face a recording medium; cutting the plurality of electric field information reading heads 110 from the electric field information reading head unit 101. If necessary, a cut surface of the electric field information reading head unit 101 may be formed to be flat.

The electric field information reading head has been described. The head according to the present invention includes the electric field information reading head, and further includes a writing electrode. Thus, the head can be used as an electric field information writing/reading head 200 of FIG. 6 so as to write electric field information and to read electric field information.

Figure 6:
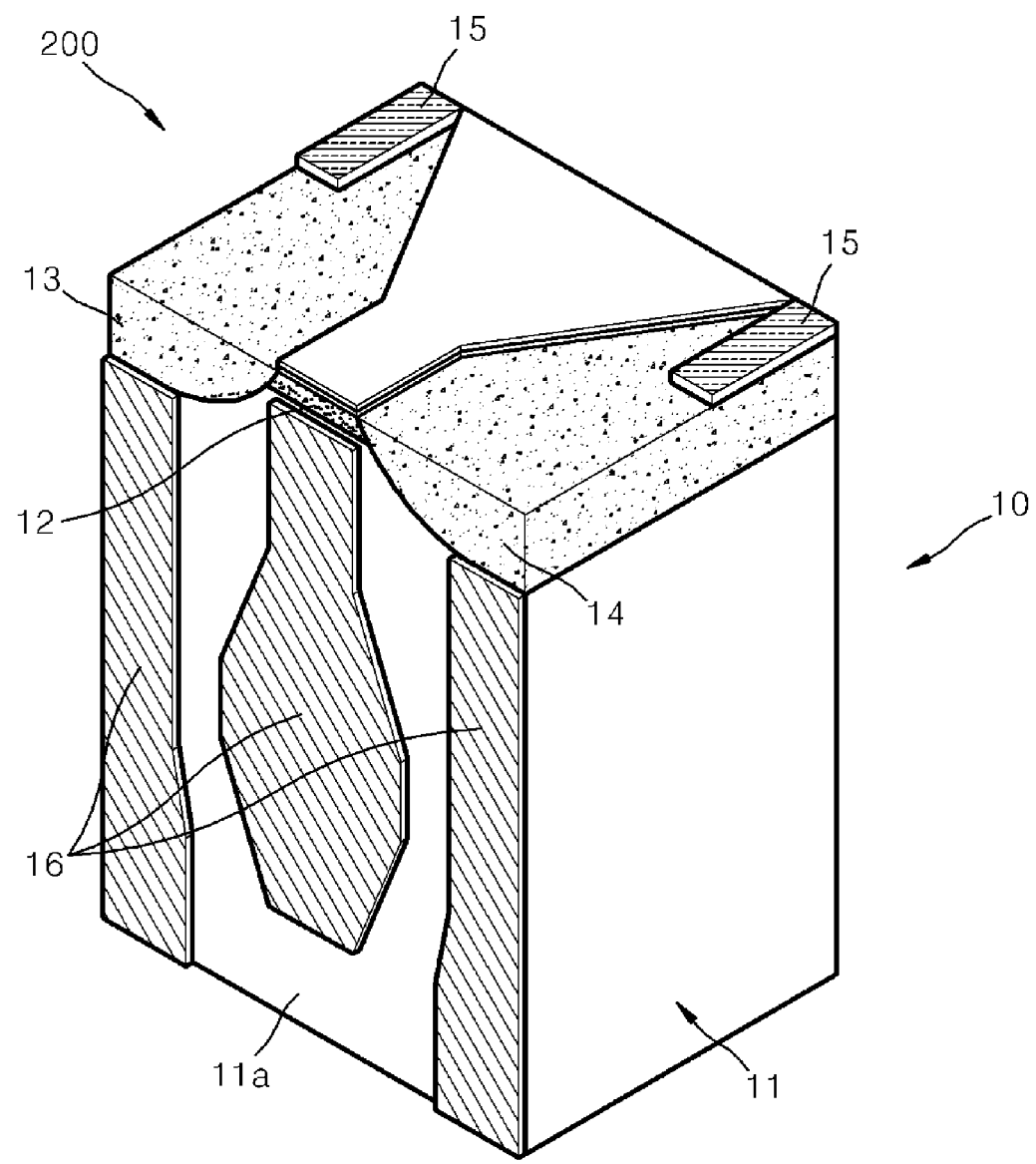
FIG. 6 is a perspective view illustrating an electric field information writing/reading head according to an embodiment of the present invention.

FIG. 6 is a perspective view illustrating the electric field information writing/reading head 200 according to an embodiment of the present invention. Compared with the electric field information reading head 10 of FIG. 2, the electric field information writing/reading head 200 further includes the writing electrode 210 to which a writing voltage is applied for recording information in a recording medium. Like reference numerals in the drawings denote like elements, and thus their description will be omitted.

The writing electrode 210 is formed on an upper surface 11b of a semiconductor substrate 11. The writing electrode 210 may be formed on a region on which a resistance region 12 of the upper surface 11b of the semiconductor substrate 11 is formed. The writing electrode 210 may be formed over a region extended from the resistance region 12 on which source and drain regions 13 and 14 are not formed. An insulating layer 220 is formed between the writing electrode 210 and the upper surface 11b of the semiconductor substrate 11. The insulating layer 220 may be formed to have a shape corresponding to the writing electrode 210.

A recording medium using the electric field information writing/reading head 200 may be a rotating disk type recording medium, and may include a lower electrode (not shown) grounding to a lower part of the recording medium.

Accordingly, when a positive (+) voltage of a threshold voltage or more is applied to the writing electrode 210, since the lower electrode disposed on the lower part of the recording medium is 0V, a surface of the recording medium is polarized to a cathode (−). On other hand, when a negative (−) voltage of a threshold voltage or less is applied to the writing electrode 210 of the electric field information writing/reading head 200, since the lower electrode disposed on the lower part of the recording medium is 0V, a surface of the recording medium is polarized to an anode (+). A polarized direction of an electric domain is different according to a voltage applied to the writing electrode 210, to thereby record information.

The electric field information writing/reading head 200 can be manufactured by a method in which the manufacturing processes of the electric field information reading head 10 illustrated in FIGS. 4A through 4E are performed, the insulating layer 220 and the writing electrode 210 are formed, and then the metal electrode 15 is formed.

The method of fabricating the electric field information writing/reading head according to the present invention on a wafer is the substantially same as that of the electric field information reading head illustrated in FIG. 5. That is, the method of fabricating the electric field information writing/reading head includes forming the at least one electric field information writing/reading head on a wafer; cutting per at least one unit including group of at least one electric field information writing/reading heads on the wafer; forming an ABS pattern on a surface of the cut unit facing a recording medium; and separating each of electric field information writing/reading head from the unit. In addition, a cut surface of the unit may be accordingly processed to be flat.

Since the method of fabricating the electric field information writing/reading head 200 will be understood based on the method of fabricating the electric field information reading head 10, a drawing for the method of fabricating the electric field information writing/reading head 200 will be omitted.

As described above, an electric field information reading head according to the present invention is used in the same mechanism of a conventional HDD, and thus, an additional servomechanism is not required. In addition, the data recording density can be improved. Also, according to the method of fabricating the electric field information reading head according to the present invention, the electric field information reading head can be mass-produced, and thus has a reduced fabricating cost and improved reliability.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An apparatus, comprising:
   a resistance region formed in a central part at one end of a surface of an electric field information reading/writing tin head which faces a recording medium, the resistance region being lightly doped with impurities;
   source and drain regions formed on both sides of the resistance region, the source and the drain regions being more highly doped with impurities than the resistance region;
   an insulating layer formed on the resistance region; and
   a write element formed on the insulating layer.

2. The apparatus of claim 1, comprising a semiconductor substrate wherein the semiconductor substrate is a p-type semiconductor, and the resistance region and the source and the drain regions are n-type semiconductors.

3. The apparatus of claim 1, comprising a semiconductor substrate wherein the semiconductor substrate is an n-type semiconductor, and the resistance region and the source and the drain regions are p-type semiconductors.

4. The apparatus of claim 1, wherein the source and the drain regions respectively extend along a side adjacent to the surface facing a recording medium, and electrodes are connected electrically with the source region and the drain region, respectively.

5. The apparatus of claim 4, further comprising an ABS pattern formed on the surface facing a recording medium.

6. An information storage device comprising:
   the apparatus of claim 1; and
   an information storage medium comprising a ferroelectric recording layer;
   wherein the surface facing a recording medium floats to a surface of the recording layer with a predetermined interval to write information on the information storage medium or read information written in the information storage medium.

7. The apparatus of claim 1, wherein the write element comprises a writing electrode.

8. The apparatus of claim 1, wherein:
   the semiconductor substrate is doped with first impurities;
   the resistance, source, and drain regions are doped with second impurities; and
   the first and second impurities differ.

9. A method comprising:
   preparing a semiconductor substrate of an electric field information reading head;
   forming a mask layer on the semiconductor substrate and patterning the mask layer in order to expose areas for forming source and drain regions;
   forming the source and drain regions by doping with impurities having a different polarity from that of the semiconductor substrate on a surface, which faces a recording medium;
   removing some part of the mask layer in order to expose an area for forming a resistance region on the semiconductor substrate; and
   forming the resistance region by doping with impurities having different polarity from that of the semiconductor substrate on the surface.

10. The method of claim 9, wherein forming the mask layer comprises:
thermal-oxidizing the surface layer formed on the semiconductor substrate to form an oxidized mask layer; and
coating a first photoresist on the oxidized mask layer to form a patterned oxidized mask layer in order to expose areas for forming the source region and the drain region on the semiconductor substrate using photolithography.

11. The method of claim 10, wherein forming the source region and drain region comprises:
ion-implanting the impurities in the semiconductor substrate and the oxidized mask layer to form the source region and the drain region on the surface of the semiconductor substrate.

12. The method of claim 11, wherein removing comprises:
coating a second photoresist on the oxidized mask layer and selectively removing the second photoresist in order to expose the area for forming the resistance region; and
etching the oxidized mask layer using the photolithography in order to expose the areas for forming the source region and drain region.

13. The method of claim 12, wherein forming the resistance region comprises:
ion-implanting the impurities having lower energy and concentration than that in forming the source region and the drain region on the oxidized mask on the upper surface and the medium opposition surface of the semiconductor substrate; and
removing the oxidized mask layer.

14. The method of claim 9, wherein forming the mask layer further comprises:
coating a first photoresist on the semiconductor substrate to form a patterned photoresist mask layer in order to expose the areas for forming the source region and drain region.

15. The method of claim 14, wherein forming the source region and drain region comprises:
ion-implanting the impurities in the semiconductor substrate and the photoresist mask layer formed on the semiconductor substrate to form the source region and the drain region.

16. The method of claim 15, wherein removing further comprises:
depositing a metal layer on the photoresist mask layer;
coating a second photoresist on the metal layer and selectively removing the second photoresist in order to expose the areas for forming the resistance region using photolithography; and etching the metal layer in order to expose the areas for forming the resistance region, the source region, and drain region.

17. The method of claim 16, wherein doping the resistance region comprises:
ion-implanting the impurities having lower energy and concentration than those in forming the source region and the drain region on the metal layer on the upper surface and the medium opposition surface of the semiconductor substrate; and
removing the metal layer and the photoresist mask layer.

18. The method of claim 9, further comprising:
forming electrodes on a surface of the semiconductor substrate.

19. The method of claim 18 comprising:
forming at least one unit constituting rows of the at least one electric field information reading head on a wafer;
cutting per the unit on the wafer;
forming an ABS pattern each corresponding to the electric field information reading head on a cutting surface of the unit; and
separating each of the electric field information reading head from the unit on which the ABS pattern is formed.

20. A method of fabricating an electric field information writing/reading head, the method comprising:
fabricating the electric field information reading head of claim 9; and
forming an insulating layer and a writing electrode on a resistance region.

21. The method of claim 20, further comprising:
forming an electrode on an upper surface of the semiconductor substrate.

22. The method of claim 21, comprising:
forming at least one unit constituting rows of the at least one electric field information writing/reading head on a wafer;
cutting per the unit on the wafer;
forming an ABS pattern each corresponding to the electric field information reading head on a cutting surface of the unit; and
separating each of the electric field information reading head from the unit on which the ABS pattern is formed.

* * * * *

UNITED STATES PATENT AND TRADEMARK OFFICE
CERTIFICATE OF CORRECTION

PATENT NO. : 8,432,001 B2
APPLICATION NO. : 12/300177
DATED : April 30, 2013
INVENTOR(S) : Ju-hwan Jung et al.

It is certified that error appears in the above-identified patent and that said Letters Patent is hereby corrected as shown below:

In the Claims

Column 8, line 13, Claim 1: "tin head which faces" should read --head which faces--.

Signed and Sealed this
Sixteenth Day of July, 2013

Teresa Stanek Rea
*Acting Director of the United States Patent and Trademark Office*